United States Patent
Akiyama et al.

(10) Patent No.: US 10,366,236 B2
(45) Date of Patent: Jul. 30, 2019

(54) SOFTWARE ANALYSIS SYSTEM, SOFTWARE ANALYSIS METHOD, AND SOFTWARE ANALYSIS PROGRAM

(71) Applicant: NIPPON TELEGRAPH AND TELEPHONE CORPORATION, Chiyoda-ku (JP)

(72) Inventors: Mitsuaki Akiyama, Musashino (JP); Takeshi Yagi, Musashino (JP); Tatsuya Mori, Tokyo (JP); Takuya Watanabe, Tokyo (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 2 days.

(21) Appl. No.: 15/574,199

(22) PCT Filed: Jul. 5, 2016

(86) PCT No.: PCT/JP2016/069881
§ 371 (c)(1),
(2) Date: Nov. 15, 2017

(87) PCT Pub. No.: WO2017/010350
PCT Pub. Date: Jan. 19, 2017

(65) Prior Publication Data
US 2018/0137281 A1 May 17, 2018

(30) Foreign Application Priority Data
Jul. 13, 2015 (JP) .................................. 2015-139910

(51) Int. Cl.
*G06F 21/00* (2013.01)
*G06F 21/56* (2013.01)
*G06F 21/62* (2013.01)

(52) U.S. Cl.
CPC ............ *G06F 21/566* (2013.01); *G06F 21/56* (2013.01); *G06F 21/62* (2013.01); *G06F 21/6245* (2013.01); *G06F 2221/033* (2013.01)

(58) Field of Classification Search
CPC .................................................... G06F 21/566
See application file for complete search history.

(56) References Cited

U.S. PATENT DOCUMENTS

2012/0179682 A1 * 7/2012 De Saeger ........ G06F 17/30401
707/737
2012/0240236 A1 9/2012 Wyatt et al.
(Continued)

OTHER PUBLICATIONS

International Search Report dated Oct. 11, 2016, in PCT/JP2016/069881 filed Jul. 5, 2016.
(Continued)

*Primary Examiner* — Alexander Lagor
*Assistant Examiner* — Syed M Ahsan
(74) *Attorney, Agent, or Firm* — Oblon, McClelland, Maier & Neustadt, L.L.P.

(57) ABSTRACT

In accordance with codes of applications, it is determined whether the applications access predetermined privacy information due to permission, a first label is assigned to an application that is determined to make an access, and a second label to an application that is determined not to make an access. The score of each word is calculated such that a high score is set to a word that is included in the text of the description of the application, to which the first label is assigned, more often than in the text of the description of the application, to which the second label is assigned, and a predetermined number of words at the top with regard to the score is extracted. The application whose text of the description includes the extracted word is classified as an application that refers to the permission.

8 Claims, 9 Drawing Sheets

(56) References Cited

U.S. PATENT DOCUMENTS

2013/0333039 A1    12/2013  Kelly
2015/0302182 A1\*  10/2015  Wyatt ................... G06F 21/564
                                                                                  726/26
2016/0335432 A1\*  11/2016  Vatamanu ............. G06F 21/552

OTHER PUBLICATIONS

Takuya Watanabe et al., "Analyzing the Inconsistency between Words and Actions of Android Apps", Computer Security Symposium 2014, Ronbunshu, IPSJ Symposium Series, Oct. 2014, vol. 2014, No. 2, pp. 590-597, English Abstract.
Rahul Pandita et al., "WHYPER: Towards Automating Risk Assesment of Mobile Applications", $22^{nd}$ USENIX Security Symposium, Aug. 14-16, 2013, pp. 527-542 (17 pages).
Extended European Search Report dated Nov. 30, 2018 in European Patent Application No. 16824330.1.
Stemler, S. "An Overview of Content Analysis", A peer-reviewed electronic journal, XP055525079, vol. 7, No. 17, Jun. 2001, pp. 1-6.

\* cited by examiner

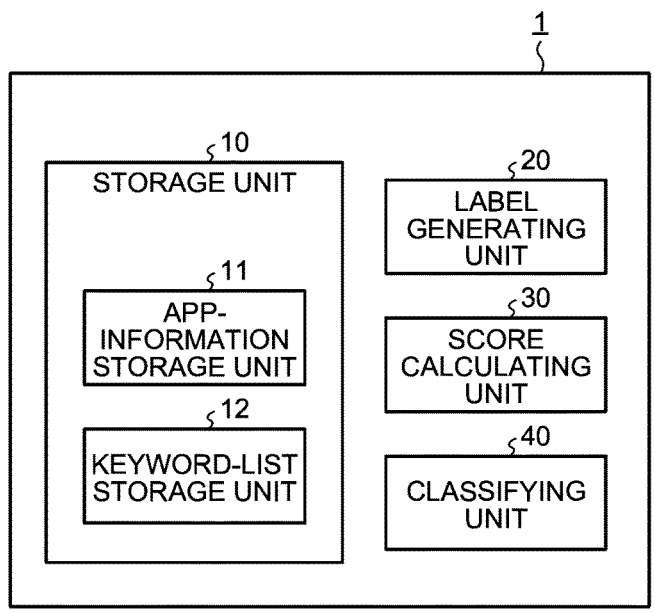

FIG.3

| PRIVACY INFORMATION | FUNCTION (PERMISSION) | KEYWORD |
|---|---|---|
| GPS INFORMATION | Location | gps, location, map |
| ACCOUNT INFORMATION | Account | username, account, password |
| CONTACT | Contact | sms, call, contact |
| CALENDAR | Calendar | calendar, reminder, meeting |
| RECEIVED SMS MAIL | SMS (read) | sms, message, incoming |
| SENT SMS MAIL | SMS (sent) | sms, message, sent |
| CAMERA FUNCTION | Camera | camera, scan, photo |

FIG.4

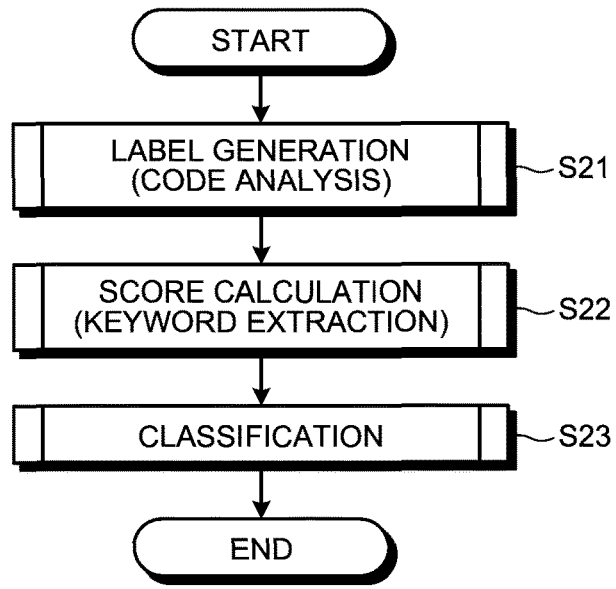

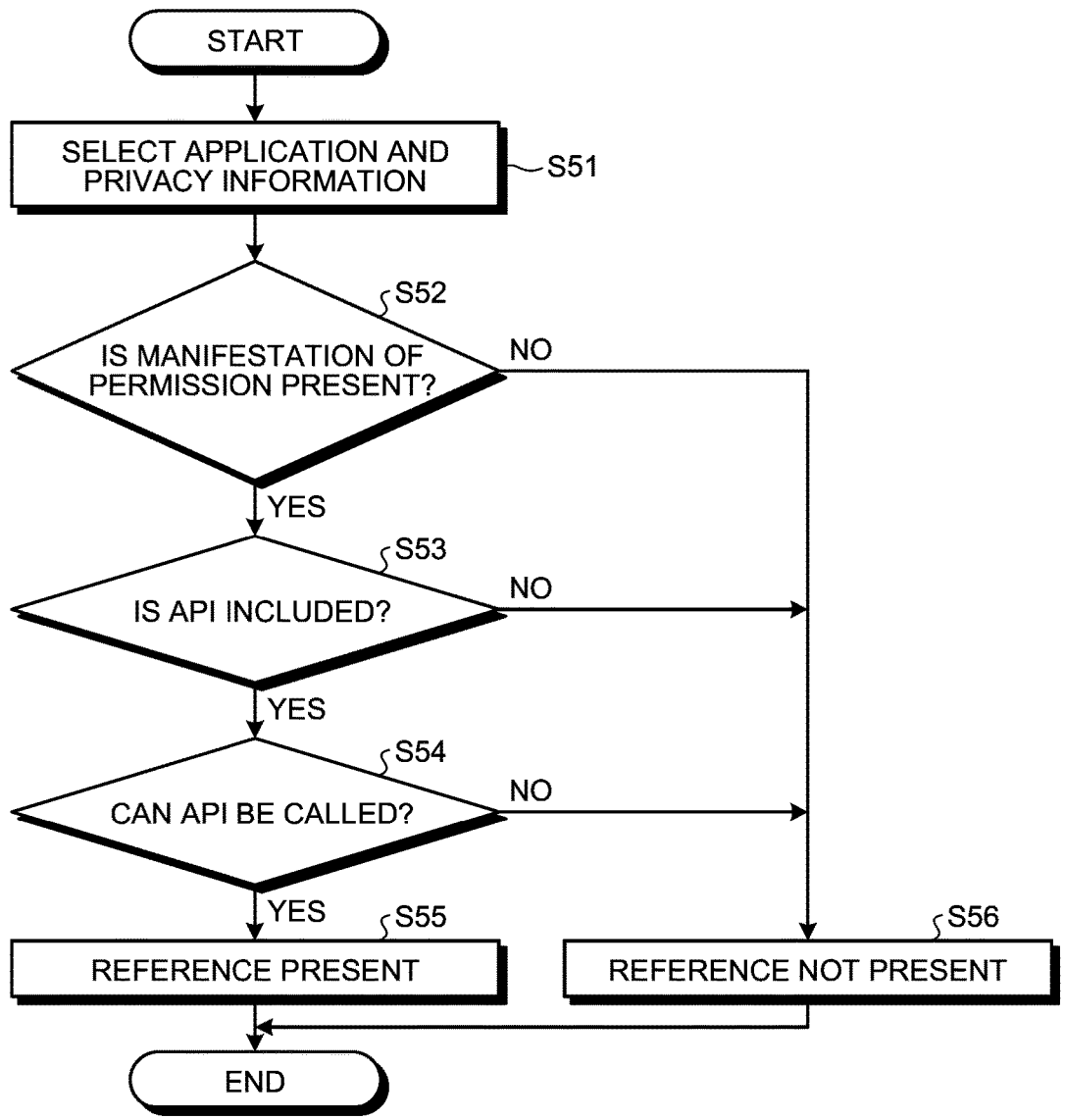

| APP ID | CODE | DESCRIPTIVE TEXT | PRIVACY INFORMATION | LABEL | CLASSIFICATION RESULT | FLAG |
|---|---|---|---|---|---|---|
| AP001 | ~~~ | ~~~ | CALENDAR | REFERENCE PRESENT | REFERENCE PRESENT | |
| | | | ADDRESS BOOK | REFERENCE NOT PRESENT | REFERENCE NOT PRESENT | |
| | | | GPS INFORMATION | REFERENCE PRESENT | REFERENCE NOT PRESENT | ON |
| AP002 | △△△ | ○○○○ | | | | |
| | | | | | | |
| | | | | | | | ns
SOFTWARE ANALYSIS SYSTEM, SOFTWARE ANALYSIS METHOD, AND SOFTWARE ANALYSIS PROGRAM

FIELD

The present invention relates to a software analysis system, a software analysis method, and a software analysis program.

BACKGROUND

In accordance with popularization of mobile terminals, such as smartphone, there are widely used applications that are used by being downloaded on mobile terminals by users. Applications, operated on mobile terminals that have Android (registered trademark), iOS (registered trademark), or the like, installed therein, often process user's privacy information. User's privacy information is acquired by hardware, such as a sensor, built in a mobile terminal or is input to a mobile terminal by the user. The privacy information is the information associated with an individual user, such as the positional information on a user, the individual identification number of a mobile terminal, or an address book.

When the application, operated in a mobile terminal, processes privacy information, there is a need to properly handle the privacy information. Furthermore, the application, operated in a mobile terminal, needs to disclose to users what kind of privacy information is to be accessed.

To meet these requests, many mobile terminal platforms has introduced the function called permission. The permission is a function that is introduced to control accesses to privacy information.

For example, the application, which uses positional information, asks a user for approval to use the permission for the positional information when the application is installed in a mobile terminal. If the user gives approval to use the permission, the application is installed in the mobile terminal. If the user does not give approval to use the permission, the application is not installed in the mobile terminal. The use of permission allows users to previously know the privacy information that is likely to be used by an application.

CITATION LIST

Non Patent Literature

Non Patent Literature 1: R. Pandita, X. Xiao, W. Yang, W. Enck, and T. Xie, "WHYPER: Towards Automating Risk Assessment of Mobile Applications", in Proc. of the 22nd USENIX Security Symposium, pp. 527-542, 2013

Non Patent Literature 2: Takuya Watanabe, Mitsuaki Akiyama, Tetsuya Sakai, Hironori Washizaki, Tatsuya Mori, "Analyzing the Inconsistency between Words and Actions of Android Apps", computer security symposium 2014 collection of papers, vol. 2014, No. 2, pp. 590-597, October 2014

SUMMARY

Technical Problem

However, the information provided by the function of the conventional permission is unobserved by users in many cases (see Non Patent Literatures 1, 2). Furthermore, the information provided by the permission function is not understandable without technical knowledges. Moreover, the information provided by the permission function is not easy to understand by users in an intuitive way. For these reasons, it is possible that an application acquires privacy information without being noticed by users.

In consideration of these circumstances, there is a disclosed technology for automatically determining whether the description of an application describes that privacy information is to be accessed. Description of an application is set in any markets, and it is also a search target when the application is searched for. For example, Non Patent Literature 1 discloses the technology in which the text of description (hereinafter, also referred to as the descriptive text or the text) of an application of a mobile terminal is analyzed to determine which section of the text corresponds to an access to privacy information. Furthermore, Non Patent Literature 2 discloses the technology in which text analysis and code analysis of an application are combined and a contradictory application is extracted if there is a contradiction between an access to privacy information, suggested by the code analysis, and the description in the text.

However, during the analysis on description according to the technologies that are disclosed in Non Patent Literatures 1, 2, a person previously reads the descriptive text of an application and conducts decoding as to whether there are descriptions that an access is made to specific privacy information. Then, in accordance with a decoding result, a label is assigned to the application. However, there is a wide variety of privacy information, and if text classification is attempted by using a statistical method, such as machine learning, a large amount of texts are prepared to assign labels. Generally, the task of manually assigning labels to data is costly. Furthermore, the technique of manually assigning labels to large-scale data is lack of scalability.

The disclosed technology has been made in consideration of the foregoing, and it has an object to provide a software analysis system, a software analysis method, and a software analysis program, which make it possible to automatically analyze whether the presence or absence of the application's access to the user's privacy information is disclosed to the user on the basis of the code and the description of the application.

Solution to Problem

The software analysis system, the software analysis method, and the software analysis program, which are disclosed, in accordance with codes of applications, determines whether the applications access predetermined privacy information due to permission. The software analysis system, the software analysis method, and the software analysis program, which are disclosed, assigns a first label to an application that is determined to access the predetermined privacy information, and assigns a second label, which is different from the first label, to an application that is determined not to access the predetermined privacy information. The software analysis system, the software analysis method, and the software analysis program, which are disclosed, calculates a score of each word included in descriptions of the applications such that a high score is set to a word that is included in a text of the description of the application, to which the first label is assigned, more often than in a text of the description of the application, to which the second label is assigned, and extracting a predetermined number of words at a top with regard to the score calculated from the descriptions of the applications in relation to the permission. The software analysis system, the software analysis method, and the software analysis program, which are disclosed, classifies the application whose text of the description includes the word extracted at the score calculating step as an application that refers to the permission and classifying the application whose text of the description does not include the word extracted at the score calculating step as an application that does not refer to the permission.

Advantageous Effects of Invention

The software analysis system, the software analysis method, and the software analysis program, which are disclosed, produce an advantage such that they make it possible to automatically analyze whether the presence or absence of the application's access to the user's privacy information is disclosed to users on the basis of the code and the description of an application.

BRIEF DESCRIPTION OF DRAWINGS

FIG. 1 is a schematic diagram that illustrates an example of the configuration of a software analysis system according to an embodiment.

FIG. 2 is a diagram that illustrates an example of the configuration of the information that is stored in an app-information storage unit.

FIG. 3 is a diagram that illustrates an example of the configuration of the information that is stored in a keyword-list storage unit.

FIG. 4 is a flowchart that illustrates an example of the flow of the process that is performed by the software analysis system according to the embodiment.

FIG. 5 is a flowchart that illustrates an example of the flow of a label generation process according to the embodiment.

DESCRIPTION OF EMBODIMENTS

Figure 6:
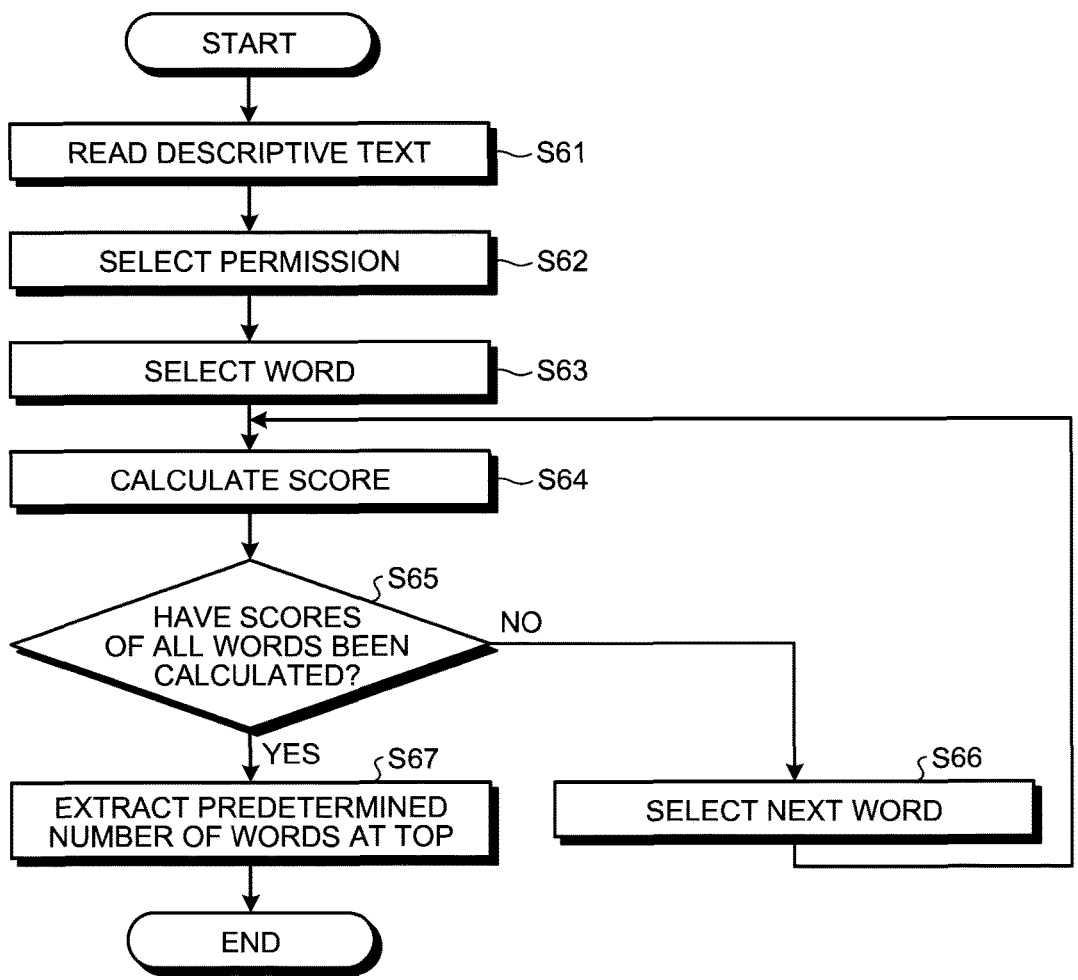
FIG. 6 is a flowchart that illustrates an example of the flow of a score calculation process (keyword extraction process) according to the embodiment.

With reference to the drawings, a detailed explanation is given below of embodiments of the disclosed system, method, and program. Furthermore, the present invention is not limited to the embodiments. Moreover, the embodiments may be combined as appropriate.

[Example of the Configuration of a Software Analysis System]

FIG. 1 is a schematic diagram that illustrates an example of the configuration of a software analysis system 1 according to an embodiment. The software analysis system 1, illustrated in FIG. 1, is for example a server that conducts a prior examination on an application, operated by an administrator of the download service that is accessed by a user to download the application into the mobile terminal. Furthermore, in the following descriptions, "application" is also referred to as "app".

The software analysis system 1 includes a storage unit 10, a label generating unit 20, a score calculating unit 30, and a classifying unit 40.

The storage unit 10 is for example a semiconductor memory device or a storage device. As the semiconductor memory device, for example, a VRAM (Video Random Access Memory), a RAM (Random Access Memory), a ROM (Read Only Memory), or a flash memory (flash memory) may be used. Furthermore, as the storage device, a storage device, such as a hard disk or an optical disk, may be used.

The storage unit 10 stores the information about the application that is the target for an analysis process by the software analysis system 1. Furthermore, the storage unit 10 stores the information obtained from a result of the analysis process by the software analysis system 1.

The storage unit 10 includes an app-information storage unit 11 and a keyword-list storage unit 12. FIG. 2 is a diagram that illustrates an example of the configuration of the information that is stored in the app-information storage unit 11. Furthermore, FIG. 3 is a diagram that illustrates an example of the configuration of the information that is stored in the keyword-list storage unit 12.

As illustrated in FIG. 2, the app-information storage unit 11 stores "code", "descriptive text", "privacy information", "label", and "classification result" in relation to "app ID".

The "app ID" is an identifier for uniquely identifying the application that is the target for the analysis process of the software analysis system 1. The "code" is the code of the application. For example, it is the source code of the application. The "descriptive text" is a text of the description of the application. The "privacy information" indicates the type of privacy information on the user, for which an access to the application is allowed by permission. The privacy information includes, for example, GPS (Global Positioning System) information, calendar, camera function, or address book.

The "label" is the label that is assigned to each application by the software analysis system 1 in accordance with a result of the code analysis by the software analysis system 1. Furthermore, the "label" is a temporary label that indicates a determination result as to whether an application accesses predetermined privacy information. There are two types of labels, "reference present" and "reference not present". The "reference present" indicates that the code contains the information that indicates the application accesses predetermined privacy information. Furthermore, the "reference not present" indicates that the code does not contain the information that indicates the application accesses predetermined privacy information. The "classification result" indicates the result of application classification by the software analysis system 1 based on whether the keyword, extracted due to an analysis on the descriptive text, is included in the descriptive text of each application. There are two types of "classification result", "reference present" and "reference not present". The "reference present" indicates that a keyword is included in the descriptive text of an application. The "reference not present" indicates that a keyword is not included in the descriptive text of an application. The "label" and the "classification result" are stored in relation to each piece of privacy information. Furthermore, the process to generate a label and a classification process to obtain a classification result are described later. Moreover, although the label and the classification result are stored in relation to the privacy information based on the assumption that the privacy information and the permission are uniquely related in FIG. 2, a configuration may be such that they are stored in relation to the permission instead of the privacy information.

In FIG. 2, for example, the descriptive text "~~~" of the application and the corresponding code "~~~" are stored in relation to the application with the app ID "AP001". Furthermore, in relation to the application, the labels and the classification results are stored, which indicate whether the application accesses three types of privacy information. With regard to "privacy information, calendar", "label, reference present" is stored. This indicates that, in accordance with the code analysis, the application with the app ID "AP001" accesses the user's calendar. Furthermore, in FIG. 2, in relation to the app ID "AP001", "privacy information, address book" and "classification result, reference not present" are stored. This indicates that the descriptive text of the application, which is identified by the app ID "AP001", does not include the keyword that corresponds to the privacy information "address book".

Next, with reference to FIG. 3, an explanation is given of the information that is stored in the keyword-list storage unit 12. As illustrated in FIG. 3, the keyword-list storage unit 12 stores "privacy information", "function (permission)", and "keyword". The "privacy information" is the same as "privacy information" that is stored in the app-information storage unit 11. The "function (permission)" is the name of the permission that allows an access to the related privacy information. The permission is, for example, "READ_CONTACTS" or "READ_CALENDER" that is defined for Android (registered trademark). The "keyword" is a keyword that is extracted from the descriptive text of an application by the software analysis system 1. The process to extract a keyword is explained later in detail.

In the example of FIG. 3, "function (permission), Location" and "keyword, gps, location, map" are stored in relation to "privacy information, GPS information". It indicates that the GPS information is the privacy information, for which an access is allowed by the function of the permission "Location". Furthermore, it indicates that three words "gps, location, map" are extracted as keywords that are related to the permission "Location". Furthermore, in the example of FIG. 3, three keywords are stored in relation to each piece of privacy information and function (permission). However, the number of keywords related to each piece of privacy information and function (permission) is not limited to three.

An explanation is further given of an example of the configuration of the software analysis system 1 with reference back to FIG. 1. The label generating unit 20 generates a label that indicates whether it is determined that each application accesses the privacy information on a user in accordance with a result of the code analysis on the basis of the information on the application, stored in the storage unit 10.

The score calculating unit 30 uses the label, generated by the label generating unit 20, to analyze the descriptive text of an application and calculates the score of each word that is included in the descriptive text. The score calculating unit 30 calculates the score of each word for each permission. The score calculating unit 30 calculates the score of each word, included in the descriptive text, such that a high score is set to a word that is included in the text of the description of the application with the label "reference present" more often than in the text of the description of application with the label "reference not present". Here, the calculation technique is not particularly limited, and for example a technique that uses the odds ratio or relevance feedback may be applied. By using these techniques, a score may be calculated on the basis of, for example, the total number of applications with the label "reference present", the total number of applications whose text of the description includes a predetermined word, or the total number of applications whose text of the description includes a predetermined word among the applications with the label "reference present".

Furthermore, according to the calculation technique, with which the score calculating unit 30 calculates scores, the settings are made such that a higher value is set to the word that frequently appears in the descriptive text of an application with the label "reference present" and that hardly appears in the descriptive text of an application with the label "reference not present". Specifically, a score calculation technique is set such that a higher score is set to a word that has a higher frequency of appearance in the descriptive text of an application with the label "reference present" than the frequency of appearance in the descriptive text of the application with the label "reference not present". Furthermore, according to a score calculation technique, the settings are made such that a higher value is set to the word that frequently appears in the descriptive text of an application that uses the API (Application Programming Interface) and that hardly appears in the descriptive text of an application that does not use the API.

As the keyword that is related to the permission, the score calculating unit 30 extracts a predetermined number of words at the top in descending order of scores in relation to the permission. The keyword is a word that is expected to appear in the descriptive text of an application, which accesses the related privacy information. The keyword extracted by the score calculating unit 30 is stored in the keyword-list storage unit 12 in relation to the privacy information and the permission.

The classifying unit 40 determines whether the descriptive text of each application includes the extracted keyword. Then, the classifying unit 40 classifies the application whose descriptive text includes the keyword as an application with "reference present". Furthermore, the classifying unit 40 classifies the application whose descriptive text does not include the keyword as an application with "reference not present". A classification result of the classifying unit 40 is stored in the app-information storage unit 11 in relation to each application and privacy information.

[Example of the Flow of the Analysis Process by the Software Analysis System]

FIG. 4 is a flowchart that illustrates an example of the flow of the process that is performed by the software analysis system 1 according to the embodiment. On the assumption of the process in FIG. 4, the software analysis system 1 previously acquires the information about multiple applications and stores them in the app-information storage unit 11 of the storage unit 10. As illustrated in FIG. 4, the analysis process by the software analysis system 1 includes the processes for label generation (code analysis) (Step S21) by the label generating unit 20, score calculation (keyword extraction) (Step S22) by the score calculating unit 30, and classification (Step S23) by the classifying unit 40. After classification is completed by the classifying unit 40, the process is terminated. An explanation is given below of the flow of the process by each unit.

[Example of the Flow of a Label Generation Process]

The label generating unit 20 generates a label of each application on the basis of the information on the application, stored in the app-information storage unit 11. FIG. 5 is a flowchart that illustrates an example of the flow of a label generation process according to the embodiment. As illustrated in FIG. 5, the label generating unit 20 first selects one application and one piece of privacy information as analysis targets (Step S51). For example, the label generating unit 20 selects the application with the app ID "AP001". Furthermore, the label generating unit 20 selects a camera function as the privacy information. The selection order of the application and the privacy information by the label generating unit 20 may be previously determined and stored in the software analysis system 1, or the application and the privacy information to be selected may be designated by a user.

Then, the label generating unit 20 reads the code of the selected application from the app-information storage unit 11. For the code of the application, if the source code may be acquired, the source code is acquired and stored in the app-information storage unit 11. Furthermore, if the source code may not be acquired, the code that is disassembled by using a technique such as reverse engineering is stored in the app-information storage unit 11.

Next, the label generating unit 20 determines whether the read code contains manifestation of the permission (Step S52). If the application uses for example Android (registered trademark), the label generating unit 20 determines whether the permission is manifested in AndroidManifest.xml.

If it is determined that the permission is manifested (Step S52, Yes), the label generating unit 20 then determines whether the code includes the API that corresponds to the selected privacy information (i.e., permission) (Step S53). Furthermore, if it is determined that the API is included (Step S53, Yes), the label generating unit 20 analyzes a call graph to determine whether the API can be actually called (Step S54). Then, if it is determined that calling is possible as a result of analysis on the call graph (Step S54, Yes), the label generating unit 20 generates the label "reference present" for the application (Step S55).

Conversely, if it is determined that the permission is not manifested (Step S52, No), the label generating unit 20 assigns the label "reference not present" to the application (Step S56). Similarly, if it is determined that the API is not included (Step S53, No) and if it is determined that calling is not possible in accordance with an analysis on the call graph (Step S54, No), the label generating unit 20 generates the label "reference not present". This terminates the label generation process. The generated label is stored in the app-information storage unit 11 in relation to the application and the privacy information.

The label generating unit 20 repeatedly performs the process illustrated in FIG. 5 on each application and privacy information to generate labels that correspond to multiple applications and privacy information and stores them in the app-information storage unit 11.

Furthermore, a label is assigned through determinations at three stages as in FIG. 5 because there is a case where, even though the code includes manifestation of the permission or the corresponding API, the code does not actually make an access to the privacy information.

[Example of the Flow of a Score Calculation Process (Keyword Extraction Process)]

The score calculating unit 30 uses the application, to which a label is assigned, and the privacy information to extract the keyword for identifying the application, which accesses the privacy information, on the basis of the descriptive text.

FIG. 6 is a flowchart that illustrates an example of the flow of the score calculation process (keyword extraction process) according to the embodiment. First, the score calculating unit 30 reads, from the app-information storage unit 11, the descriptive texts that correspond to the applications, for which the label generation process has been terminated (Step S61). Then, the score calculating unit 30 selects the permission (Step S62). Furthermore, the score calculating unit 30 analyzes the read descriptive text and selects one word that is included in the descriptive text (Step S63).

Then, the score calculating unit 30 calculates the score of the selected word (Step S64). An explanation is given below of an example of calculating a score by using relevance feedback. For example, the score calculating unit 30 uses the following Equation (1) to calculate a score. Equation (1) is an equation for calculating the score of the word $w_i$ that is included in the ith (i is a natural number equal to or more than 1 and equal to or less than N) application $A_i$ among the N (N is a natural number) applications in total as analysis targets.

$$RW(w_i) = \log \frac{(r_i + 0.5)(N - n_i - R + r_i + 0.5)}{(n_i - r_i + 0.5)(R - r_i + 0.5)} \quad (1)$$

Here, in Equation (1), R is the total number of applications to which the label "reference present" is assigned, and $r_i$ is the total number of applications whose descriptive text includes the word $w_i$ and to which the label "reference present" is assigned. Furthermore, N is the number of applications in total as analysis targets, and $n_i$ is the total number of applications whose descriptive text includes the word $w_i$. Furthermore, in Equation (1), 0.5 is added to prevent the numerator or the denominator from becoming zero. Here, the added value is not limited to 0.5, and it may be for example 0.1 or 0.6.

Next, the score calculating unit 30 determines whether the scores of all the words have been calculated (Step S65). If it is determined that the scores of all the words have not been calculated (Step S65, No), the score calculating unit 30 selects the word that is the next target to be processed (Step S66). Then, the process returns to Step S64. Conversely, if it is determined that the scores of all the words have been calculated (Step S65, Yes), the score calculating unit 30 sorts the words in the descending order of scores, calculated for each permission, and extracts a predetermined number of words at the top (Step S67). For example, the score calculating unit 30 extracts three words at the top. Here, the number of words to be extracted is three because if the number of extracted words is three, the finally obtained classification accuracy is desired according to the inventors' experimental results. Furthermore, the number of words to be extracted may be set to a different number. Thus, the score calculation process (keyword extraction process) is terminated.

Furthermore, the above example uses the technique for calculating scores by using relevance weight. However, the equation for calculating scores is not limited to the above-described example. The equation for calculating scores may be the one that quantifies the character of a word that is likely to be included in one set of applications and is unlikely to be included in the other set of applications.

For example, the odds ratio may be used as scores. First, the probability at which a predetermined word is included in the set of applications with the label "reference present" is p, and the probability at which it is included in the set of applications with the label "reference not present" is q. Then, the odds ratio is calculated by dividing (p/(1−p)) by (q/(1−q)). It means that, as the calculated odds ratio is larger, the predetermined word is likely to be included in the set of applications with the label "reference present" and it is unlikely to be included in the set of applications with the label "reference not present".

For example, if the probability p, at which the word "SNS" is included in the set of applications with the label "reference present", is 0.9 and the probability q, at which it is included in the set of applications with the label "reference not present", is 0.1, the odds ratio of 81 is calculated according to the above equation. In the same manner, the odds ratio is calculated with regard to other words, and the odds ratio becomes a score. Then, the words are ranked in descending order of scores. Finally, the words in the upper rankings may be sequentially extracted as the keywords that are more likely to be included in the set of applications with "reference present".

[Example of the Flow of the Classification Process]

Figure 7:
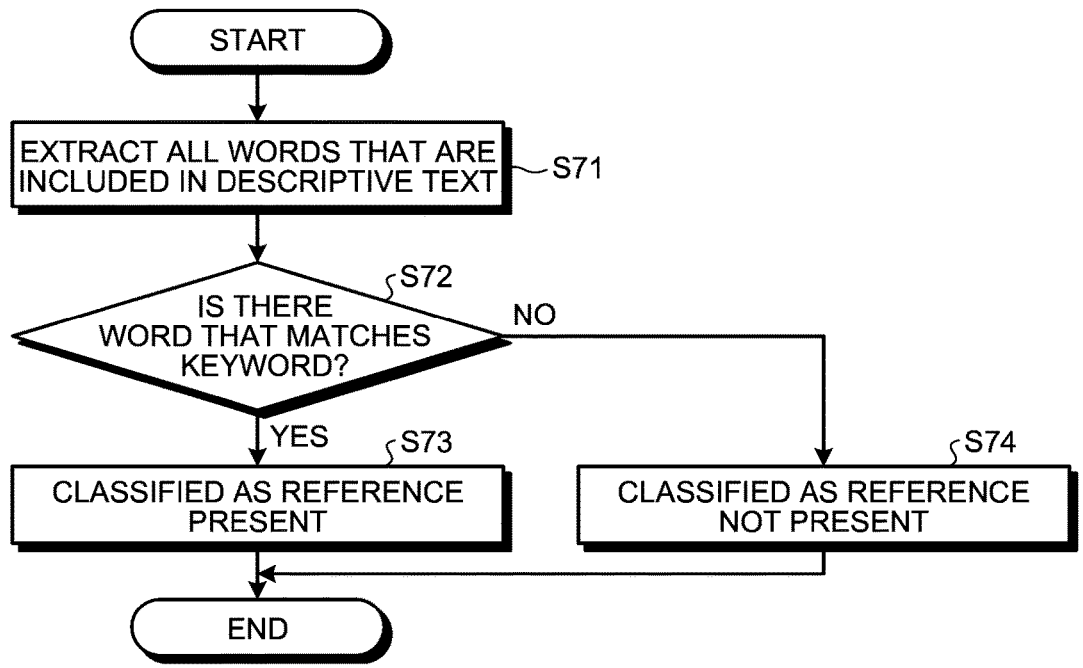
FIG. 7 is a flowchart that illustrates an example of the flow of a classification process according to the embodiment.

The classifying unit 40 classifies an application based on whether each application accesses the privacy information in accordance with the keyword that is extracted by the score calculating unit 30 and the descriptive text of the application. FIG. 7 is a flowchart that illustrates an example of the flow of the classification process according to the embodiment.

The classifying unit 40 first reads the descriptive text of the application, which is the target for classification, from the app-information storage unit 11. Then, the classifying unit 40 extracts all the words that are included in the descriptive text (Step S71). Then, the classifying unit 40 determines whether the words extracted from the descriptive text include the word that matches the keyword extracted by the score calculating unit 30 (Step S72). If it is determined that the matching word is included (Step S72, Yes), the classifying unit 40 classifies the application as an application with "reference present" to the permission that corresponds to the keyword (Step S73). Here, the classification "reference present" indicates that it is determined that the application accesses the privacy information, an access to which is allowed by the permission that corresponds to the keyword. Conversely, if it is determined that the matching word is not included (Step S72, No), the classifying unit 40 classifies the application as an application with "reference not present" to the permission that corresponds to the keyword (Step S74). Here, the classification "reference not present" indicates that it is determined that the application does not access the privacy information, an access to which is allowed by the permission that corresponds to the keyword. Thus, the classification process is terminated.

Figure 8:
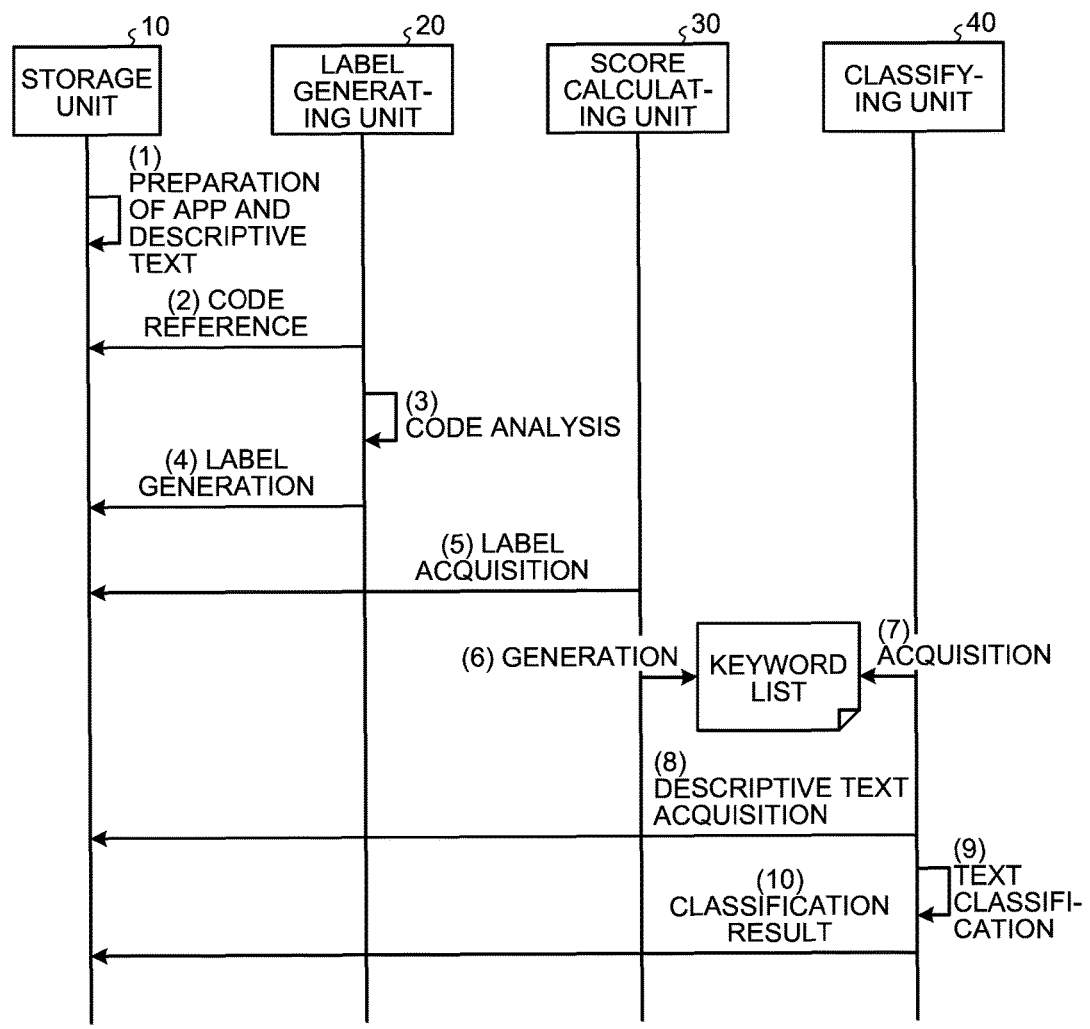
FIG. 8 is a sequence diagram that illustrates an example of the flow of the process that is performed by the software analysis system according to the embodiment.

FIG. 8 is a sequence diagram that illustrates an example of the flow of the process that is performed by the software analysis system 1 according to the embodiment. The process illustrated in FIG. 8 corresponds to the flow of the process that is illustrated with reference to FIG. 4 to FIG. 7.

As illustrated in FIG. 8, in the software analysis system 1, the information on the application and the descriptive text are first prepared as the targets for analysis ((1) in FIG. 8). For example, the software analysis system 1 acquires data on the application via a network and stores it in the storage unit 10.

Then, the label generating unit 20 refers to the code of the application, stored in the storage unit 10 ((2) in FIG. 8) and executes analysis on the code ((3) in FIG. 8). The label generating unit 20 generates a label in accordance with a result of the code analysis and stores it in the storage unit 10 ((4) in FIG. 8).

The score calculating unit 30 acquires the information on the application and the label, stored in the storage unit 10 ((5) in FIG. 8) and performs the score calculation process (keyword generation process) ((6) in FIG. 8). As a result of the process by the score calculating unit 30, a keyword list is generated and is stored in the storage unit 10. Next, the classifying unit 40 acquires the keyword list from the storage unit 10 ((7) in FIG. 8). Furthermore, the classifying unit 40 acquires the descriptive text from the storage unit 10 ((8) in FIG. 8). The classifying unit 40 executes text classification on the basis of the keyword list and the descriptive text, which are acquired ((9) in FIG. 8). Then, the classification result, which is obtained as a result of the process by the classifying unit 40, is stored in the storage unit 10 ((10) in FIG. 8).

Advantage of the Embodiment

As described above, the software analysis system according to the above-described embodiment includes a label generating unit, a score calculating unit, and a classifying unit. Furthermore, on the basis of the codes of applications, the label generating unit determines whether the applications access predetermined privacy information due to permission. Moreover, the label generating unit assigns a first label ("reference present") to the application that is determined to access the predetermined privacy information and assigns a second label ("reference not present"), which is different from the first label, to the application that is determined not to access the predetermined privacy information. The score calculating unit calculates the score of each word included in the descriptions of applications such that a high score is set to a word that is included in the text of the description of the application, to which the first label is assigned, more often than in the text of the description of the application, to which the second label is assigned, and extracts a predetermined number of words at the top with regard to the calculated score from the descriptions of the applications in relation to permission. The classifying unit classifies the application whose text of the description includes the word extracted by the score calculating unit as an application that refers to the permission and classifies the application whose text of the description does not include the word extracted by the score calculating unit as an application that does not refer to the permission.

Therefore, by combining code analysis and analysis on text of description, the software analysis system according to the embodiment may accurately determine the presence or absence of the application's access to privacy information and the presence or absence of reference to an access to privacy information in the description of the application. Furthermore, the software analysis system according to the embodiment may automate analysis on text of description, thereby improving processing efficiency and costs of text analysis. Moreover, the software analysis system according to the embodiment may automatically extract words that are characteristically included in the description of an application that accesses privacy information, thereby improving the processing efficiency and the costs. Thus, the software analysis system according to the embodiment may automatically analyze whether the presence or absence of the application's access to the user's privacy information is disclosed to the user on the basis of the code and the description of the application.

Modified Example

According to the above-described embodiment, on the basis of the code and the descriptive text of each application, the software analysis system 1 determines whether the application accesses predetermined privacy information. Furthermore, on the basis of the descriptive text, the software analysis system 1 according to the above-described embodiment makes a classification as to whether each application discloses an access to privacy information in the description. An explanation is given below of a modified example where the software analysis system conducts analysis on a newly detected application to acquire a classification result and, in accordance with a classification result, determines whether it is a malignant application or a benign application. The software analysis system according to the modified example is further configured to give a warning to a user if a newly detected application is a malignant application.

Figure 9:
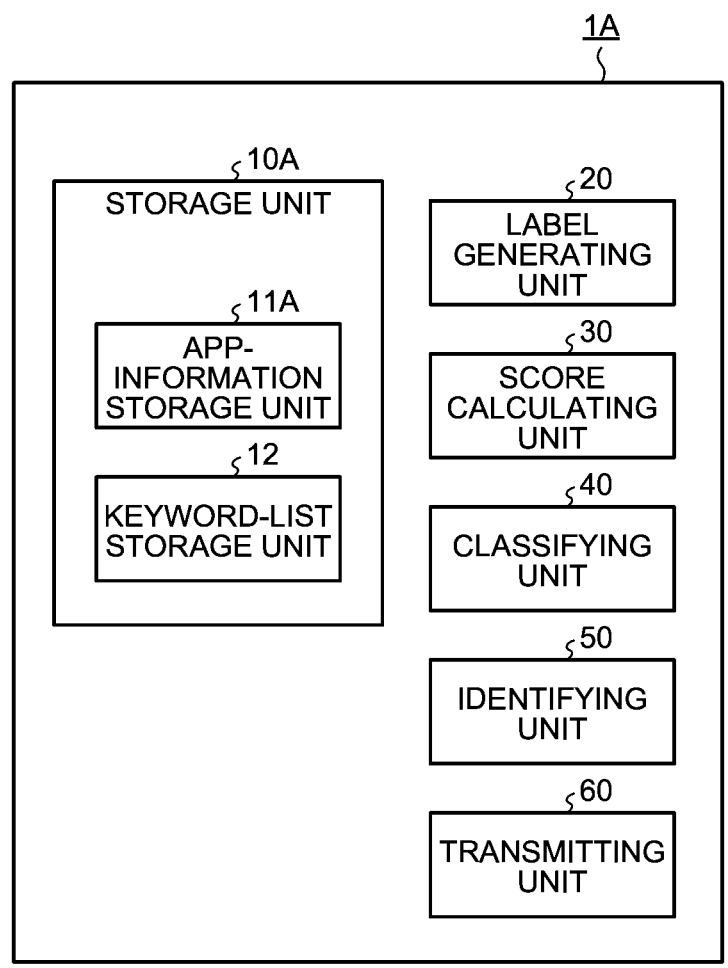
FIG. 9 is a schematic diagram that illustrates an example of the configuration of a software analysis system according to a modified example.

FIG. 9 is a schematic diagram that illustrates an example of the configuration of a software analysis system 1A according to the modified example. As illustrated in FIG. 9, the software analysis system 1A according to the modified example includes a storage unit 10A, the label generating unit 20, the score calculating unit 30, the classifying unit 40, an identifying unit 50, and a transmitting unit 60. Furthermore, the storage unit 10A includes an app-information storage unit 11A and the keyword-list storage unit 12. The label generating unit 20, the score calculating unit 30, and the classifying unit 40 have the same configurations and functions as those of the label generating unit 20, the score calculating unit 30, and the classifying unit 40, included in the software analysis system 1 according to the above-described embodiment. Furthermore, the information stored in the keyword-list storage unit 12 is the same as that in the case of the software analysis system 1 according to the above-described embodiment. The software analysis system 1A according to the modified example is different from the software analysis system 1 according to the above-described embodiment in that it includes the identifying unit 50 and the transmitting unit 60 and in the information stored in the app-information storage unit 11A. In the following description, explanations are omitted for the same configuration and function as those of the software analysis system 1 according to the above-described embodiment, and explanations are given for different aspects.

The identifying unit 50 compares the label generated by the label generating unit 20 with the classification result of the classifying unit 40 to identify a contradictory application. For example, in the information stored for the application with the app ID "AP001" in FIG. 2, the label related to "privacy information, GPS information" is "reference present", and the classification result is "reference not present". It indicates that, according to the result of code analysis on the application that is identified with the app ID "AP001", the application accesses the user's GPS information. Furthermore, it indicates that, according to the result of analysis on the descriptive text of the application, there is no reference to the application's access to the user's GPS information in the description. That is, the application with the app ID "AP001" is an application that is distributed in a state such that, although the application accesses "GPS information", which is the user's privacy information, the user cannot notice it by only reading the description. Thus, the identifying unit 50 identifies the application, of which "label" and "classification result" do not match.

Figures 10, 11:
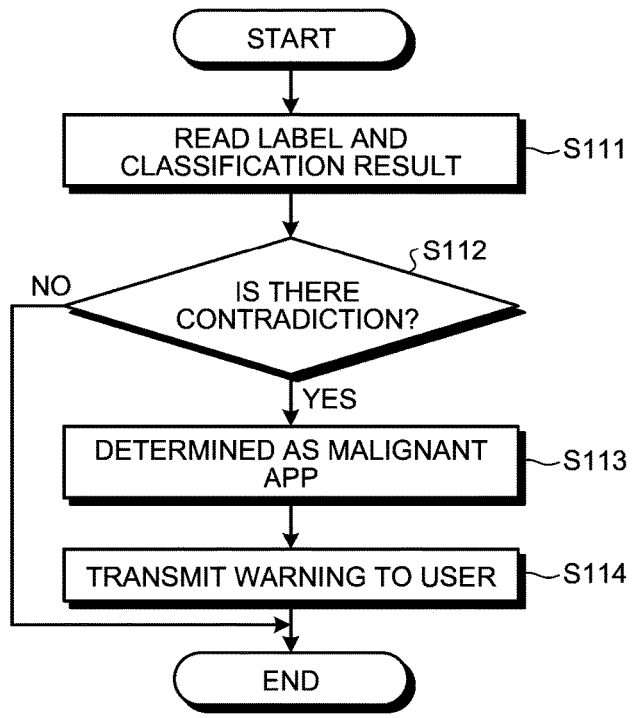
FIG. 10 is a diagram that illustrates an example of the configuration of the information stored in an app-information storage unit according to the modified example.
FIG. 11 is a flowchart that illustrates an example of the flow of the process that is performed by the software analysis system according to the modified example.

With regard to the application that is identified by the identifying unit 50, the flag indicative of malignancy is stored in the app-information storage unit 11A. FIG. 10 is a diagram that illustrates an example of the configuration of the information stored in the app-information storage unit 11A according to the modified example. In the example of FIG. 10, "flag, ON" is stored in relation to "app ID, AP001", "privacy information, GPS information", "label, reference present", and "classification result, reference not present". It means that, although the application with the app ID "AP001" accesses the GPS information, the description does not mention it, and it is assumed to be a malignant application.

The transmitting unit 60 transmits, to the user's mobile terminal, the warning indicating that the application is estimated to be a malignant application when the user downloads the application that is determined to be a malignant application by the identifying unit 50. The transmitting unit 60 transmits, for example, the notification that it is estimated to be a malignant application and the privacy information that is accessed by the application.

FIG. 11 is a flowchart that illustrates an example of the flow of the process that is performed by the software analysis system 1A according to the modified example. First, the identifying unit 50 reads the corresponding label and classification result from the app-information storage unit 11A (Step S111). Then, the identifying unit 50 determines whether there is a contradiction between the label and the classification result that are read (Step S112). For example, if the label is "reference present" and the classification result is "reference not present", the identifying unit 50 determines that there is a contradiction. Furthermore, if the label is "reference not present" and the classification result is "reference not present", the identifying unit 50 determines that there is no contradiction.

If it is determined that there is a contradiction (Step S112, Yes), the identifying unit 50 determines that the application is a malignant app (Step S113). Then, the identifying unit 50 turns on the flag, which indicates a malignant application, in relation to the information on the application, stored in the app-information storage unit 11A. Conversely, if it is determined that there is no contradiction (Step S112, No), the identifying unit 50 terminates the process.

Then, the transmitting unit 60 transmits a warning to the user who has downloaded the application that is determined to be a malignant application by the identifying unit 50 (Step S114). Thus, the process of the identifying unit 50 and the transmitting unit 60 according to the modified example is terminated.

Advantage of the Modified Example

Thus, the software analysis system 1A according to the modified example further includes the identifying unit that identifies, as a malignant application, the application to which the first label ("reference present") is assigned by the label generating unit and which is classified by the classifying unit as an application that does not refer to permission. Therefore, the software analysis system 1A may easily identify the application, for which there is a contradiction between a result of code analysis and a result of text analysis and may extract it as a malignant application.

Furthermore, the software analysis system A according to the modified example further includes the transmitting unit that transmits warning information when a mobile terminal has installed therein the application to which the first label ("reference present") is assigned by the label generating unit and which is classified by the classifying unit as an application that does not refer to permission. Thus, it is possible to warn a user, who downloads an application by using the mobile terminal, that there is a possibility that it is a malignant application.

Other Embodiments

Although the embodiments of the present invention have been explained above, the present invention may be implemented by other embodiments than the above-described embodiment. Other embodiments are explained below.

According to the above-described embodiment, the software analysis system 1 previously stores the information on one or more applications. However, this is not a limitation, and the software analysis system may be configured to be connected to an information terminal, or the like, of an application creator who files an application via a network so as to receive and analyze the application that is transmitted from the information terminal. In this case, a configuration may be such that the transmitting unit 60 transmits a result of the process by the identifying unit 50 to the information terminal of the application creator. Furthermore, in this case, a configuration may be such that the score calculating unit does not calculate scores or extract keywords. Specifically, the classifying unit may use keywords, already stored in the keyword-list storage unit 12 to conduct classification of a new application. With this configuration, each time a new application is received, the keyword list does not need to be updated, and the process of the classifying unit may be promptly performed.

Furthermore, the software analysis system 1 may be configured to be connected to servers of one or more providers who provide application services via a network. Furthermore, a configuration may be such that the provider's server transmits a new application to the software analysis system 1 as appropriate so that it becomes an analysis target.

[System Configuration, or the Like]

The components of each device illustrated are functionally conceptual and do not necessarily need to be physically configured as illustrated. Specifically, specific forms of separation and combination of each device are not limited to those illustrated, and a configuration may be such that all or some of them are functionally or physically separated or combined in an arbitrary unit depending on various types of loads or usage. For example, a configuration may be such that the keyword-list storage unit 12 is stored in a storage device outside the software analysis system 1 and a different server uses a keyword to identify a malignant application.

Furthermore, all or any of various processing functions performed by each device may be implemented by a CPU and programs that are analyzed and executed by the CPU or may be implemented as wired logic hardware.

Among the processes described in the present embodiment, all or some of the processes that are automatically performed as described may be performed manually, or all or some of the processes that are manually performed as described may be performed automatically by using a well-known method. Furthermore, the operation procedures, the control procedures, the specific names, and the information including various types of data and parameters as described in the above specifications and the drawings may be arbitrarily changed except as otherwise noted.

[Program]

Furthermore, it is also possible to generate a program that describes the process that is performed by the software analysis systems 1, 1A, which are explained in the above embodiment, in the language that is executable by a computer. For example, it is also possible to generate a program that describes the process that is performed by the software analysis systems 1, 1A according to the embodiment in the language that is executable by a computer. In this case, the computer executes the program so that the same advantage as that in the above-described embodiment may be obtained. Furthermore, the program is recorded in a recording medium readable by a computer and the program, recorded in the recording medium, is read and executed by the computer so that the same process as that in the above-described embodiment may be performed. An explanation is given below of an example of the computer that executes the program that implements the same function as that in the software analysis systems 1, 1A.

Figure 12:
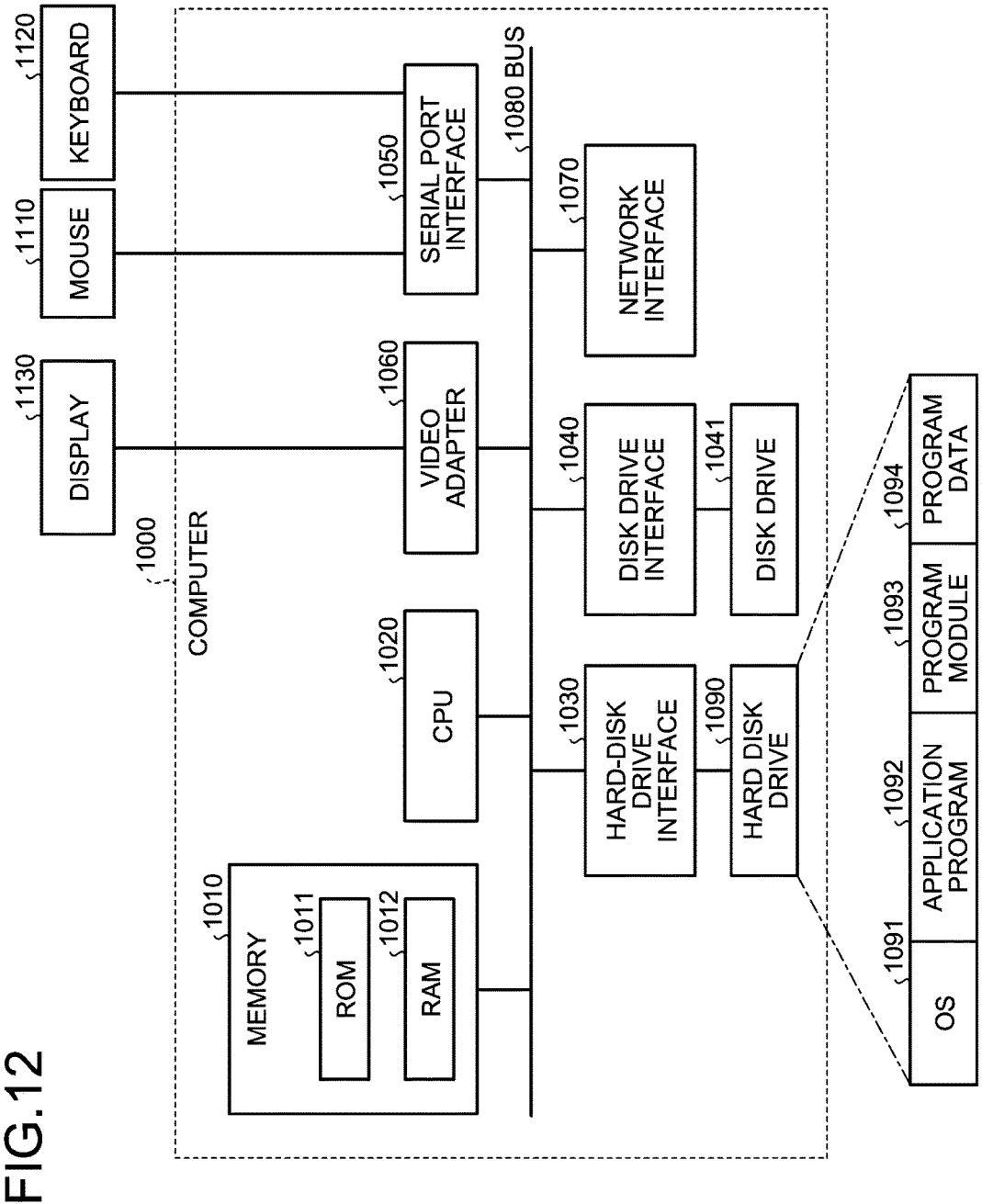
FIG. 12 is a diagram that illustrates a computer that executes a software analysis program according to the embodiment.

FIG. 12 is a diagram that illustrates a computer 1000 that executes a software analysis program. As illustrated in FIG. 12, the computer 1000 includes, for example, a memory 1010, a CPU (Central Processing Unit) 1020, a hard-disk drive interface 1030, a disk drive interface 1040, a serial port interface 1050, a video adapter 1060, and a network interface 1070, and each of the units is connected via a bus 1080.

As illustrated in FIG. 12, the memory 1010 includes a ROM (Read Only Memory) 1011 and a RAM (Random Access Memory) 1012. The ROM 1011 stores, for example, a boot program, such as BIOS (Basic Input Output System). As illustrated in FIG. 12, the hard-disk drive interface 1030 is connected to a hard disk drive 1090. As illustrated in FIG. 12, the disk drive interface 1040 is connected to a disk drive 1041. For example, a removable storage medium, such as a magnetic disk or an optical disk, is inserted into the disk drive 1041. The serial port interface 1050 is connected to for example a mouse 1110 and a keyboard 1120, as illustrated in FIG. 12. The video adapter 1060 is connected to for example a display 1130, as illustrated in FIG. 12.

Here, as illustrated in FIG. 12, the hard disk drive 1090 stores, for example, an OS (Operating System) 1091, an application program 1092, a program module 1093, and program data 1094. Specifically, the above-described program is stored in for example the hard disk drive 1090 as a program module that describes a command that is executed by the computer 1000.

Furthermore, various types of data, explained in the above-described embodiment, are stored as program data in for example the memory 1010 or the hard disk drive 1090. Furthermore, the CPU 1020 reads the program module 1093 or the program data 1094, stored in the memory 1010 or the hard disk drive 1090, into the RAM 1012 as needed so as to perform various procedures.

Furthermore, the program module 1093 or the program data 1094 related to the program is not necessarily stored in the hard disk drive 1090 but it may be stored in for example a removable storage medium and read by the CPU 1020 via a disk drive, or the like. Alternatively, the program module 1093 or the program data 1094 related to the program may be stored in a different computer, connected via a network (LAN (Local Area Network), WAN (Wide Area Network), or the like) and read by the CPU 1020 via the network interface 1070.

REFERENCE SIGNS LIST 1, 1A SOFTWARE ANALYSIS SYSTEM
10, 10A STORAGE UNIT 11, 11A APP-INFORMATION STORAGE UNIT
12 KEYWORD-LIST STORAGE UNIT
20 LABEL GENERATING UNIT
30 SCORE CALCULATING UNIT
40 CLASSIFYING UNIT
50 IDENTIFYING UNIT
60 TRANSMITTING UNIT

The invention claimed is:

1. A software analysis system comprising: processing circuitry configured to, in accordance with codes of applications,
- determine whether the applications access predetermined privacy information due to permission, assign a first type of label to any application from the applications that is determined to access the predetermined privacy information, and assign a second type of label, which is different from the first type of label, to any application that is determined not to access the predetermined privacy information;
- calculate a score of each word included in descriptions of the applications such that a high score is set to a word that is included in a text of the description of the application, to which the first type of label is assigned, more often than in a text of the description of the application, to which the second type of label is assigned, and extract a predetermined number of words having a highest score with regard to the score calculated from the descriptions of the applications in relation to the permission; and
- classify any application from the applications whose text of the description includes at least one of the predetermined number of words extracted by the processing circuitry as an application that refers to the permission and classify any application from the applications whose text of the description does not include the word extracted by the processing circuitry as an application that does not refer to the permission, such that the processing circuitry indicates whether there is a discrepancy between whether the text of the description of a respective application does or does not refer to the permission and whether a code of the respective application actually does or does not access the predetermined privacy information due to the permission.

2. The software analysis system according to claim 1, the processing circuitry being further configured to identify, as a malignant application, an application to which the first type of label is assigned based on the code actually accessing the predetermined privacy information due to the permission and which is classified as an application for which the text of the description does not refer to the permission.

3. The software analysis system according to claim 1, wherein the processing circuitry is configured to transmit warning information when a mobile terminal has installed therein an application to which the first type of label is assigned and which is classified as an application that does not refer to the permission.

4. The software analysis system according to claim 1, further comprising a memory that stores a word extracted by the processing circuitry and the permission in a related manner, wherein when a new application is detected, the processing circuitry classifies the application as any of an application that refers to the permission and an application that does not refer to the permission in accordance with the word that is stored in the memory in relation to the permission.

5. The software analysis system according to claim 1, wherein the processing circuitry calculates a score of a predetermined word in accordance with at least a total number of applications to which the first type of label is assigned, a total number of applications whose text of the description includes the predetermined word, or a total number of applications whose text of the description includes the predetermined word among the applications to which the first type of label is assigned.

6. The software analysis system according to claim 1, wherein the processing circuitry calculates the score of the word according to Equation (1) as follows:

$$RW(w_i) = \log\frac{(r_i + 0.5)(N - n_i - R + r_i + 0.5)}{(n_i - r_i + 0.5)(R - r_i + 0.5)}; \quad (1)$$

wherein in Equation (1), $w_i$ is a word included in an application $A_i$, i is a natural number equal to or more than 1 and equal to or less than N, R is a total number of applications to which the first type of label is assigned, $r_i$ is a total number of applications that include the word $w_i$ among the applications, N is a number of the applications in total, and $n_i$ is a total number of applications that include the word $w_i$.

7. A software analysis method, implemented by processing circuitry of a software analysis system, comprising:
- in accordance with codes of applications, determining whether the applications access predetermined privacy information due to permission, assigning a first type of label to any application from the applications that is determined to access the predetermined privacy information, and assigning a second type of label, which is different from the first type of label, to any application that is determined not to access the predetermined privacy information;
- calculating a score of each word included in descriptions of the applications such that a high score is set to a word that is included in a text of the description of the application, to which the first type of label is assigned, more often than in a text of the description of the application, to which the second type of label is assigned, and extracting a predetermined number of words having a highest score with regard to the score calculated from the descriptions of the applications in relation to the permission; and
- classifying any application from the applications whose text of the description includes at least one of the predetermined number of words extracted by the processing circuitry as an application that refers to the permission and classifying any application from the applications whose text of the description does not include the word extracted by the processing circuitry as an application that does not refer to the permission, such that the method includes indicating whether there is a discrepancy between whether the text of the description of a respective application does or does not refer to the permission and whether a code of the respective application actually does or does not access the predetermined privacy information due to the permission.

8. A non-transitory computer-readable recording medium having stored software analysis program causing processing circuitry of a software analysis system to execute a process comprising:
- in accordance with codes of applications, determining whether the applications access predetermined privacy information due to permission, assigning a first type of label to any application from the applications that is determined to access the predetermined privacy information, and assigning a second type of label, which is different from the first type of label, to any application that is determined not to access the predetermined privacy information;

calculating a score of each word included in descriptions of the applications such that a high score is set to a word that is included in a text of the description of the application, to which the first type of label is assigned, more often than in a text of the description of the application, to which the second type of label is assigned, and extracting a predetermined number of words having a highest score with regard to the score calculated from the descriptions of the applications in relation to the permission; and classifying any application from the applications whose text of the description includes at least one of the predetermined number of words extracted by the processing circuitry as an application that refers to the permission and classifying any application from the applications whose text of the description does not include the word extracted by the processing circuitry as an application that does not refer to the permission, such that the method includes indicating whether there is a discrepancy between whether the text of the description of a respective application does or does not refer to the permission and whether a code of the respective application actually does or does not access the predetermined privacy information due to the permission.

* * * * *